United States Patent [19]

Iwatsuka et al.

[11] Patent Number: 5,500,915
[45] Date of Patent: Mar. 19, 1996

[54] OPTICAL FIBER TERMINAL FITTED WITH OPTICAL ISOLATOR

[75] Inventors: Shinji Iwatsuka, Oamishirasato; Masaaki Kobayashi, Narita; Kenjiro Hata, Matsudo, all of Japan

[73] Assignee: TDK Corporation, Tokyo, Japan

[21] Appl. No.: 401,743

[22] Filed: Mar. 9, 1995

[30]   Foreign Application Priority Data

Mar. 18, 1994  [JP]  Japan ................................. 6-072800

[51] Int. Cl.⁶ ....................................................... G02B 6/26
[52] U.S. Cl. ................ 385/78; 385/73; 385/33; 372/703
[58] Field of Search ............................ 385/33, 73, 25, 385/49, 52, 64, 73, 75, 34, 96; 359/484, 282, 280, 900; 372/703

[56]   References Cited

U.S. PATENT DOCUMENTS

| | | | |
|---|---|---|---|
| 4,150,865 | 4/1979 | Iliff | 339/26 |
| 4,878,731 | 11/1989 | Caron et al. | 385/27 |
| 4,962,990 | 10/1990 | Matsuzawa et al. | 385/34 |
| 5,040,863 | 8/1991 | Kawakahi et al. | 385/31 |
| 5,121,451 | 6/1992 | Grard et al. | 385/33 |
| 5,212,746 | 5/1993 | Miller et al. | 385/73 |
| 5,359,689 | 10/1994 | Iwatsuka et al. | 385/73 |
| 5,359,689 | 10/1994 | Iwatsuka et al. | 385/73 |

FOREIGN PATENT DOCUMENTS

| | | |
|---|---|---|
| 63-65419 | 3/1988 | Japan. |
| 63-123014 | 5/1988 | Japan. |

*Primary Examiner*—Akm E. Ullah
*Attorney, Agent, or Firm*—Panitch Schwarze Jacobs & Nadel

[57]   ABSTRACT

An optical fiber terminal fitted with an optical isolator in close proximity in a unitary structure comprises an optical fiber, a ferrule which holds the optical fiber in position, at least one magneto-optical element located as aligned with the optical fiber, and a cylindrical permanent magnet that applies a magnetic field to the magneto-optical element. The magneto-optical element is disposed axially outside of the magnet, and the end face of the optical fiber is located in the hollow of the magnet or in the space between the magnet and the magneto-optical element, so that the overall outside diameter and length can be decreased. The ferrule, made of a soft magnetic material, increases the magnetic field strength of the magnet.

9 Claims, 4 Drawing Sheets

OPTICAL FIBER TERMINAL FITTED WITH OPTICAL ISOLATOR

BACKGROUND OF THE INVENTION

This invention relates to improvements in an optical isolator which consists of a combination of a magneto-optical element and a permanent magnet, and more specifically to a small optical fiber terminal fitted with an optical isolator for such applications as semiconductor laser modules and optical amplifiers.

Optical isolators are used in optical amplifiers, semiconductor laser modules, and the like. They comprise a polarizer, a magneto-optical element that functions as a Faraday rotator, and another polarizer, all combined between a laser light source and an optical fiber terminal or between two optical fiber terminals, further combined with a permanent magnet to saturate or magnetize the magneto-optical element.

Generally, scatters in the position of light incident upon the optical isolator and in the diameter of the beam cause variations in the characteristics of the isolator. There is a demand, therefore, that the isolator characteristics remain unaffected by some changes in the incident position and the beam diameter. The scatters can be avoided if the optical isolator is combined integrally with an optical fiber terminal to provide a singular unit, since the combination establishes a constant relation between the two components, making the adjustments therebetween no longer necessary. We previously proposed an optical fiber terminal fitted with an optical isolator having this advantage in U.S. Pat. No. 5,359,689.

The optical fiber terminal fitted with an optical isolator disclosed in the above-cited U.S. Patent has, besides the afore-described advantage, the merit of being handled as simply as a mere optical fiber terminal not fitted with an optical isolator.

The invention of the prior application is characterized in that an optical fiber, a ferrule that holds the fiber in position, and an unsaturated optical isolator located on the end face of the fiber are assembled integrally so that the maximum outside diameter of the optical isolator can be either substantially equal to, or not more than twice, the outside diameter of the ferrule. However, the optical characteristics required of the sandwich consisting of a magneto-optical element and polarizers, placed in the hollow of the cylindrical magnet, restrict the decrease of its diameter, and naturally the outside diameter of the magnet cannot be decreased appreciably. For this reason the optical fiber terminal fitted with an optical isolator according to the prior application has the drawback of being unable to achieve satisfactory size reduction.

There is another related invention which does not pertain to an optical fiber terminal fitted with an optical isolator but to an optical isolator itself. Patent Application Public Disclosure No. Sho 63-123014 disposes a Faraday rotator axially outside of a cylindrical permanent magnet which is magnetized in its axial direction and saturates the Faraday rotator magnetically with the magnetic field created by the permanent magnet. The cylindrical permanent magnet may have a small inside diameter and hence the magnet too may have a small outside diameter. However, this presents a problem of increased overall length of the optical isolator. An elongated isolator, when used for a semiconductor laser module, for example, would place a limitation to the lens system. An additional disadvantage is that, because the magnetic field portion outside of the magnet is much weakened compared with the inside, a large magnet must be used to achieve magnetic saturation.

As explained above, it has hitherto been impossible to decrease both the outside diameter and length of an integrated combination of an optical isolator and an optical fiber terminal.

It is therefore an object of the present invention to provide an optical fiber terminal fitted with an optical isolator which is shorter and smaller in outside diameter than usual.

Another object of the invention is to provide an optical fiber terminal fitted with an optical isolator in which the permanent magnet can generate an increased magnetic field strength.

SUMMARY OF THE INVENTION

After an intensive search for solutions of the foregoing problems, it has now been found that the above objects are realized by an optical fiber terminal fitted with an optical isolator in close proximity in a unitary structure which comprises an optical fiber, a ferrule which holds the optical fiber in position, at least one magneto-optical element located as aligned with the optical fiber, and a cylindrical permanent magnet that applies a magnetic field to the magneto-optical element, the magneto-optical element being disposed axially outside of the magnet, with the end face of the optical fiber being located in the hollow of the magnet or in the space between the magnet and the magneto-optical element.

The invention also provides an optical fiber terminal fitted with an optical isolator which comprises an optical fiber, a ferrule which holds the optical fiber in position, at least one magneto-optical element located as aligned with the optical fiber, and a cylindrical permanent magnet that applies a magnetic field to the magneto-optical element, the magneto-optical element being disposed axially outside of the magnet, and the ferrule being made of a soft magnetic material to enhance the strength of the permanent magnet.

DETAILED DESCRIPTION OF THE INVENTION

It is, of course, possible to locate the end face of the optical fiber inside the hollow of the magnet or in the space between the magnet and the magneto-optical element and make the ferrule from a soft magnetic material.

The optical isolator may be either saturated or unsaturated type. When the former is chosen, the permanent magnet is to have a strength such as to generate a sufficient magnetic field for magnetic saturation of the magneto-optical element. Preferably, the permanent magnet to be used is capable of producing a temperature-dependent magnetic field to compensate for the changes with temperature of the angle of Faraday rotation of the magneto-optical element, as described in U.S. Pat. No. 5,359,689, with the magnetic field magnetizing the magneto-optical element short of saturation.

According to the present invention, the magneto-optical element is disposed axially outside of the permanent magnet and the end face of the optical fiber is located inside the hollow of the permanent magnet or in close proximity of the magneto-optical element. This arrangement permits decreases of both the length (especially the distance between the end face of the optical fiber and the tip of the optical isolator) and the outside diameter of the optical fiber terminal fitted with the optical isolator. The shortened distance between the end face of the fiber and the tip of the isolator makes it easier for one skilled in the art to design coupling of the optical isolator-incorporating optical fiber terminal of this invention to a semiconductor laser and optical fiber through a lens system.

In yet another embodiment of the invention, the ferrule is made of a soft magnetic material. This amounts to increasing the length of the permanent magnet, adding to the strength of its magnetic field or facilitating the size reduction of the magnet.

Figure 1:
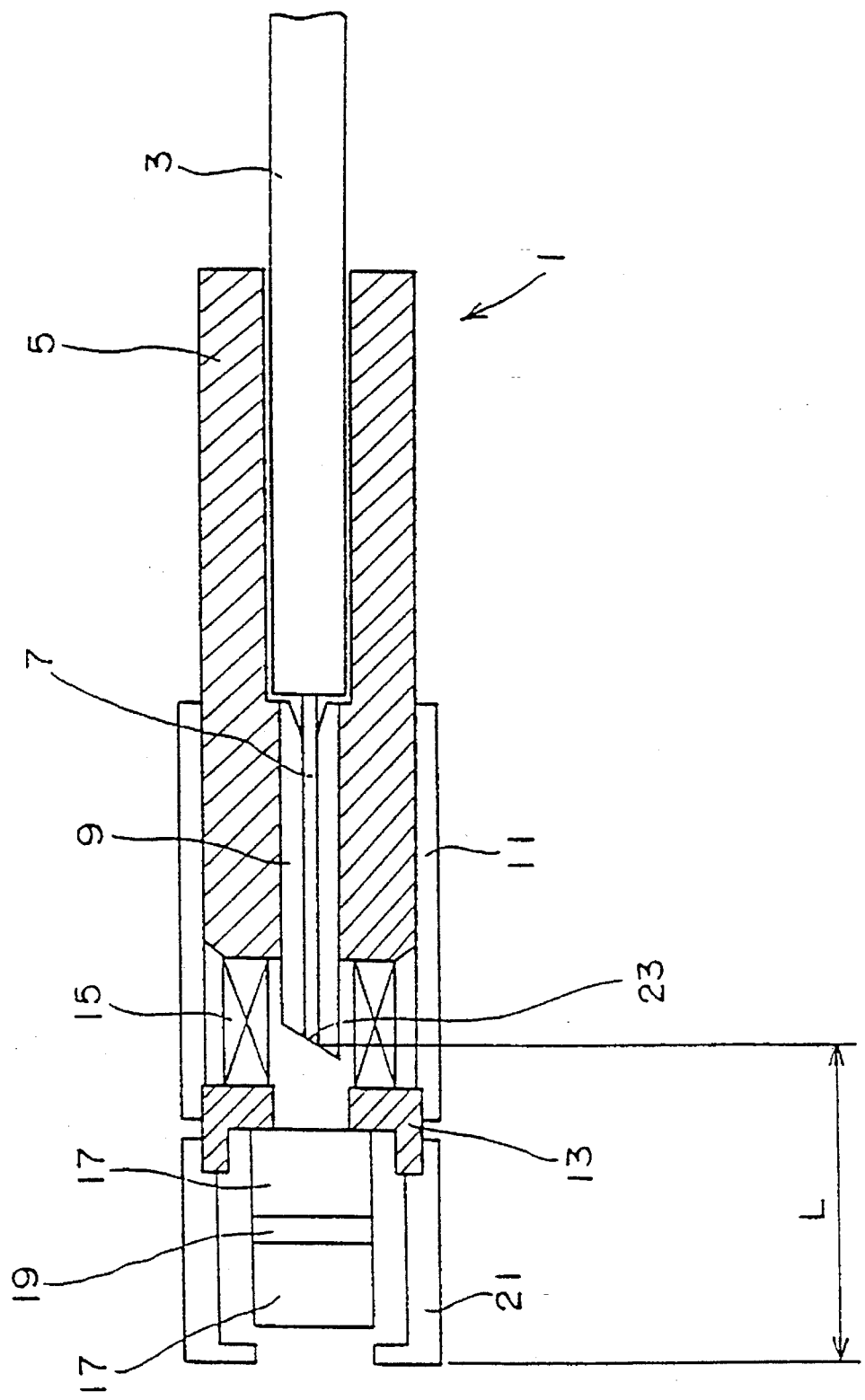
FIG. 1 is a sectional view of an optical fiber terminal fitted with an optical isolator embodying the present invention.

An optical fiber terminal 1 fitted with an optical isolator embodying the present invention will now be described in detail with reference to FIG. 1. As shown, a length of optical fiber 3 is fixedly supported at one end in the hollow of a cylindrical ferrule 5 made of a soft magnetic material such as magnetic stainless steel. The bare part 7 of the optical fiber 3 is fitly secured in a ferrule capillary tube 9 of a nonmagnetic material (glass, ceramic, nonmagnetic stainless steel, or the like) which, in turn, is supported in the bore of the ferrule 5. The tip of the bare part 7 is ground obliquely and flush with the end of the ferrule capillary tube 9 to form a slanted end face together.

Around the front end portion of the ferrule 5 is fixed a cylindrical connecting sleeve 11 of nonmagnetic stainless steel or the like. An annular magnetic yoke 13 of magnetic stainless steel or other soft magnetic material is mounted around the tip of the sleeve 11. An axially magnetized, cylindrical permanent magnet 15 is fitted in between the ferrule 5 and the magnetic yoke 13, in intimate contact with the both members. The magnetic yoke has a steplike recess on the inner side of its front end portion, which supports, as soldered securely thereto, an optical isolator device which is a sandwich consisting of two polarizers 17 and one magneto-optical element 19 (the number of the components being variable according to the functions required). A cap 21 of nonmagnetic stainless steel or the like to protect the magneto-optical element is fixed to the front end of the magnetic yoke 13.

The optical isolator device is formed as a rectangular block which looks rectangular as it is seen from the direction in which light travels, with the light-transmitting plane of polarization set in agreement with one side of the rectangle. This makes the plane of polarization definite enough to facilitate the assembling and marking for register of the components. The polarizer on the incidence side may be omitted where a laser diode as the light source (not shown) produces linearly polarized light. The magneto-optical element may, for example, be any of the magnetic garnets in wide use for optical communication. Either a saturated type that is magnetically saturated or an unsaturated type that is not may be employed.

In the case of the saturated type, a more than saturated magnetic field is applied to the magneto-optical element. The ferrule of magnetic material as used in the embodiment being described is advantageous in that it permits enlargement of the magnetic field as will be explained later.

With the unsaturated type, variations of the characteristics depending on the location of the magneto-optical element can present problems. Joining the optical fiber and optical isolator integrally as taught by the present invention fixes the position of light incidence and emergence relative to the optical isolator and the diameter of the beam. It is no longer necessary to consider the uniformity of characteristics with locations; the characteristics of the optical isolator have only to be optimized after the integral joining.

For instance, the applicable magnetic field is changed by modifying the size, shape, or/and characteristics of at least one of the three components, i.e., the magnetic ferrule 5, magnetic yoke 13, and magnet 15, and the characteristics of the optical isolator are adjusted to be optimum for the service conditions to be encountered and then fixed.

Alternatively, the optical isolator characteristics may be optimized by adjusting the distance between the magneto-optical element and the magnet, taking the advantage of the phenomenon in which the magnitude of the magnetic field varies continuously with the distance of the element from the magnet.

The unsaturated type offers the advantage of realizing favorable temperature characteristics, as we revealed in Japanese Patent Application Public Disclosure Nos. Hei 4-31821 and 5-27207.

As shown, the end face 23 of the optical fiber is located inside the bore of the magnet 15. It may extend into the bore of the magnetic yoke 13 instead. This shortens the distance L between the front end of the optical isolator and the end face 23 of the optical fiber, a key parameter for the subsequent coupling to a semiconductor laser module or the like through lenses. The shorter the distance the easier the designing of the lens coupling becomes owing to a broader range of available lenses.

The above arrangement also permits the size reduction of the optical isolator, compared with the prior art arrangement of the magnet surrounding the magneto-optical element, as is exemplified below. In the conventional arrangement, if the magneto-optical element dimensions normal to the beam measure 1.3 mm by 1.3 mm, then the magnet must have an inside diameter of at least 1.8 mm. Considering the wall thicknesses of the magnet and the outer sleeve, it is impossible that the magnet have an outside diameter of about 3 mm. Under the invention, by contrast, the outside diameter of about 3 mm is easily realized because the magnet is located axially outside of the element. The overall size could be reduced even by the known technique if a smaller magneto-optical element were used. However, much difficulties would then be involved in handling the element. Another limitation would be the impossibility of making the size smaller than the light transmission region.

The optical fiber terminal fitted with an optical isolator in conformity with the invention, nearly as small in outside diameter as the ferrule and with the short distance L, can be handled in exactly the same manner as ordinary fiber terminals and is most conveniently handled when it is coupled to a semiconductor laser module or another fiber terminal through lenses.

Figure 2:
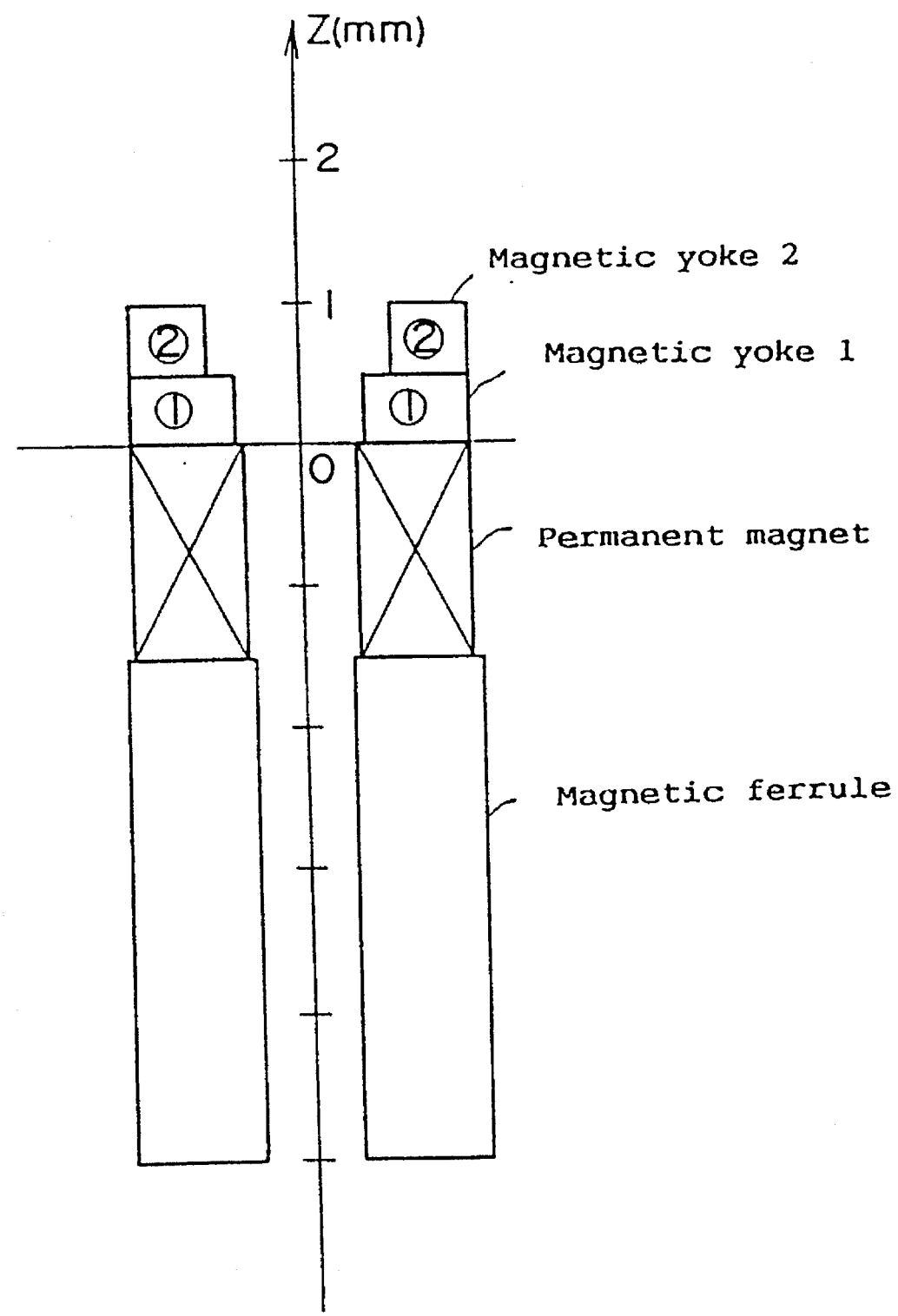
FIG. 2 is a schematic block diagram of a typical arrangement of a magnet and magnetic yokes in an optical fiber terminal fitted with an optical isolator in accordance with the invention.
Figure 3:
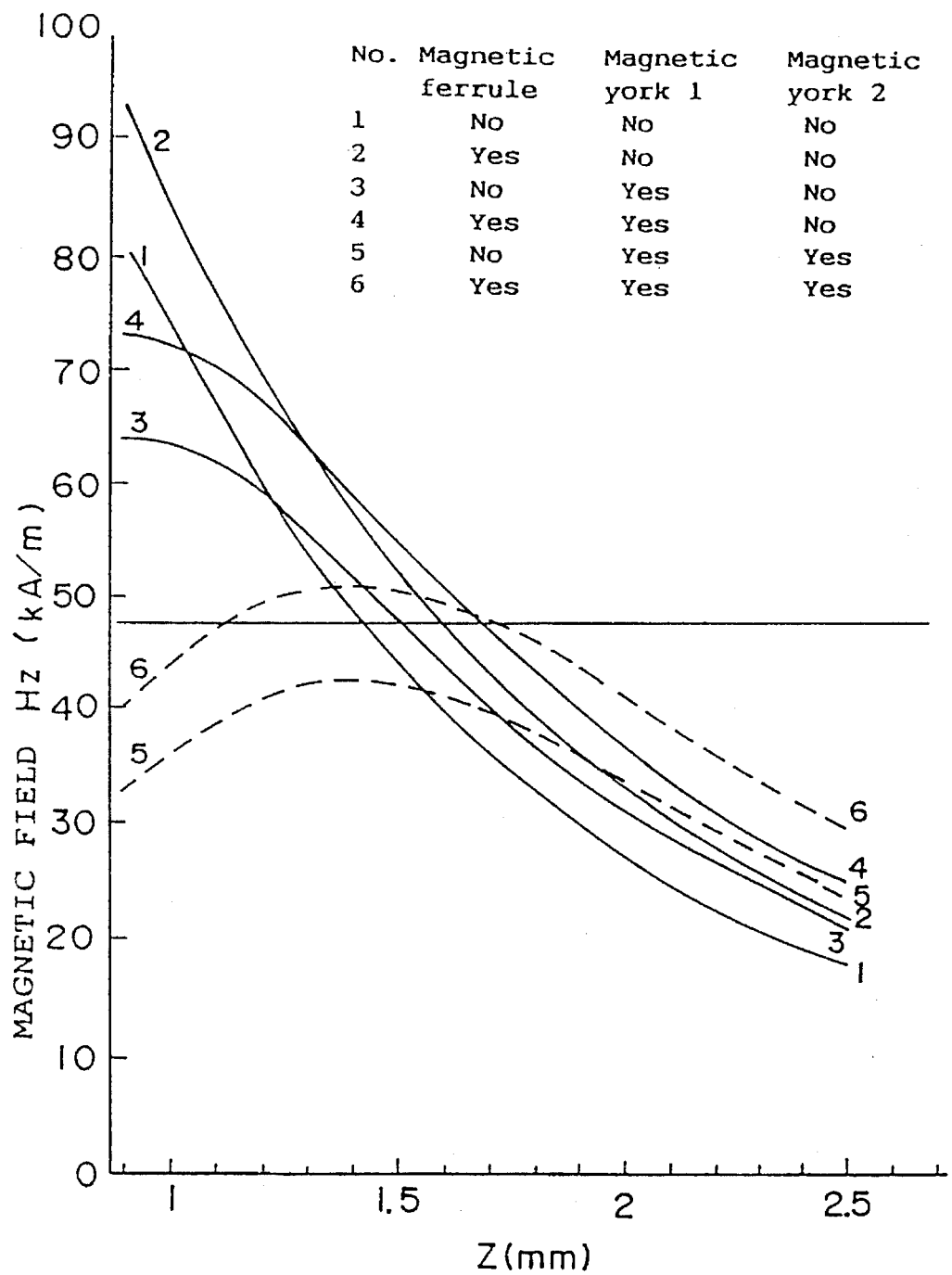
FIG. 3 is a graphic representation of computations with the arrangement of FIG. 2.

The fact that the use of the magnetic ferrule 5 adds to the strength of the magnetic field applicable to the magneto-optical element 19 could be confirmed. Computations for that purpose were made with a model arrangement, as shown in FIG. 2, which comprised: a magnetic ferrule having an outside diameter of 2.5 mm, inside diameter of 0.7 mm, length of 3.5 mm, and relative permeability μ=100; an axially magnetized magnet having an outside diameter of 2.4 mm, inside diameter of 0.8 mm, length of 1.5 mm, and remnant magnetic flux density of 0.9 T (9000 G); a magnetic yoke (1) having an outside diameter of 2.4 mm, inside diameter of 0.9 mm, length of 0.5 mm, and relative permeability A=100; and a magnetic yoke having an outside diameter of 2.4 mm, inside diameter of 1.8 mm, length of 0.5 mm, and relative permeability μ=100. The results are graphically represented in FIG. 3, with the Z-axis position (in mm) as abscissa and the magnetic field strength (in kA/m) as ordinate. The curves 1–6 represented the following:

TABLE 1

| Curve | Magnetic ferrule | Magnetic yoke (1) | Magnetic yoke (2) |
|---|---|---|---|
| 1 | no | no | no |
| 2 | yes | no | no |
| 3 | no | yes | no |
| 4 | yes | yes | no |
| 5 | no | yes | yes |
| 6 | yes | yes | yes |

A remarkable observation was that the magnetic field distribution varies extremely with the presence or absence of the magnetic ferrule. It means that the magnetic ferrule strengthens the magnetic field (as typified by the increases in strength from curve 1 to curve 2, from 3 to 4, and from 5 to 6, respectively). The magnetic yoke (1) is effective in the region of Z=1.3 mm or more and the magnetic yoke (2), in the region of Z=1.7 mm or more. Thus the strength of the magnetic field applicable to the magneto-optical element can be increased or otherwise controlled by adjustments of the shape, size, and location of those parts, along with the effect of the magnetic ferrule.

Figure 4:
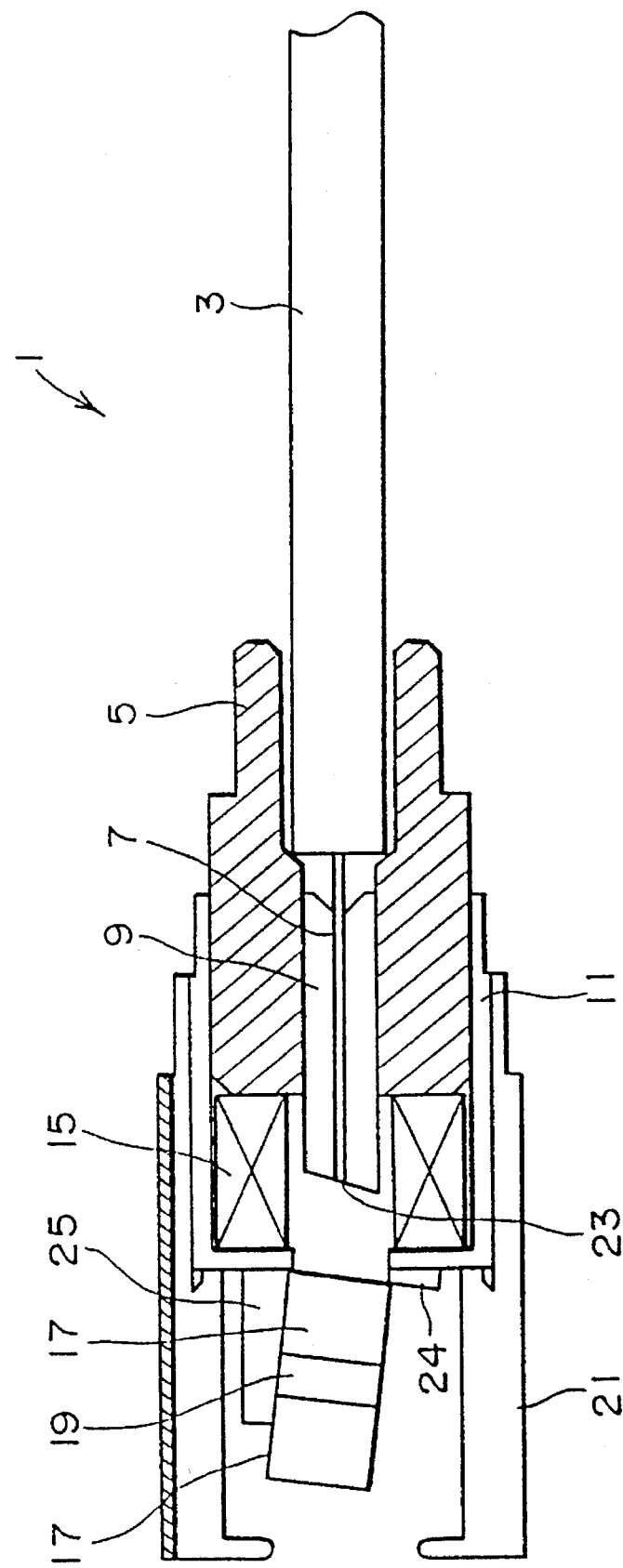
FIG. 4 is a sectional view of another embodiment of an optical fiber terminal fitted with an optical isolator embodying the present invention.

Another preferred embodiment of an optical fiber terminal 1 fitted with an optical isolator embodying the present invention will now be described in detail with reference to FIG. 4. Members similar to those in FIG. 1 will be indicated by similar reference numerals. As shown, a length of optical fiber 3 is fixedly supported at one end in the hollow of a cylindrical ferrule 5 made of a soft magnetic material such as magnetic stainless steel. The bare part 7 of the optical fiber 3 is fitly secured in a ferrule capillary tube 9 of a nonmagnetic material (glass, ceramic, nonmagnetic stainless steel, or the like) which, in turn, is supported in the bore of the ferrule 5. The tip of bara part 7 is ground obliquely and flush with the end of the ferrule capillary tube 9 to form a slanted end face together.

Around the front end portion of the ferrule 5 is fixed a cylindrical connecting sleeve 11 of nonmagnetic stainless steel or the like. An axially magnetized, cylindrical permanent magnet 15 is fitted in between the ferrule 5 and forward end of the sleeve 11 in intimate contact with the both members. On the outer surface of the tip of the sleeve 11, an optical isolator device which is a sandwich consisting of two polarizers 17 and one magneto-optical element 19 (the number of the components being variable according to the functions required) is mounted by means of retainers 24 and 25, in such manner that the end face of the isolator device is not perpendicular to the axis of the optical fiber core 7. With this arrangement, the light reflected from the face of the isolator device is prevented from returning to the optical fiber. A cap 21 of non-magnetic stainless steel is fixed to the front end of the sleeve 11 to protect the magneto-optical elements. It will be evident from the construction that the characteristic operation of this embodiment is not particularly different from the first embodiment.

While the embodiments described above represents the preferred form of the present invention, it will be understood that various modifications may be made therein. For example, the yokes and ferrule may be made of nonmagnetic materials instead.

As has been described above, the present invention makes it possible to reduce the size of an optical fiber terminal fitted with an optical isolator, shorten its optical length, and facilitates its fabrication. The terminal of the invention is optimally used for semiconductor laser modules and can be handled as simply as ordinary optical fiber terminals.

What is claimed is:

1. An optical fiber terminal fitted with an optical isolator in close proximity in a unitary structure which comprises:

an optical fiber;

a ferrule which holds the optical fiber in position;

at least one magneto-optical element located as aligned with the optical fiber; and a cylindrical permanent magnet that applies a magnetic field to the magneto-optical element, said magneto-optical element being disposed axially outside of said magnet, with the end face of said optical fiber being located in the hollow of said magnet or in the space between said magnet and said magneto-optical element.

2. An optical fiber terminal as claimed in claim 1 wherein said ferrule is made of a soft magnetic material.

3. An optical fiber terminal as claimed in claim 1 wherein said permanent magnet generates a sufficient magnetic field to saturate said magneto-optical element magnetically.

4. An optical fiber terminal as claimed in claim 1 wherein said permanent magnet generates a magnetic field for magnetic unsaturation such that the angle of Faraday rotation of said magneto-optical element is kept constant independently of temperature.

5. An optical fiber terminal as claimed in claim 1 wherein said magneto-optical element has a surface which is not perpendicular to the axis of the optical fiber.

6. An optical fiber terminal fitted with an optical isolator in close proximity in a unitary structure which comprises:

an optical fiber;

a ferrule which holds the optical fiber in position;

at least one magneto-optical element located as aligned with the optical fiber; and a cylindrical permanent magnet that applies a magnetic field to the magneto-optical element, said magneto-optical element being disposed axially outside of said magnet, said ferrule being made of a soft magnetic material.

7. An optical fiber terminal as claimed in claim 6 wherein said permanent magnet generates a sufficient magnetic field to saturate said magneto-optical element magnetically.

8. An optical fiber terminal as claimed in claim 6 wherein said permanent magnet generates a magnetic field for magnetic unsaturation such that the angle of Faraday rotation of said magneto-optical element is kept constant independently of temperature.

9. An optical fiber terminal as claimed in claim 6 wherein said magneto-optical element has a surface which is not perpendicular to the axis of the optical fiber.

* * * * *